Patented June 6, 1933

1,912,815

UNITED STATES PATENT OFFICE

GEORGE WITTY, OF NEW YORK, N. Y.

SLAG CEMENT

No Drawing. Application filed July 22, 1931. Serial No. 552,541.

It is an object of the present invention to provide a slag cement of this class, in which the binding qualities will be raised to the highest degree, and in which the maximum amount of strength may be afforded.

Another object is to provide a slag cement composition which will possess qualities of water-proofing and strength exceeding those of any known kind of cement, and which will be cheap to manufacture and adapted for shipment in a dry powder form to be mixed with water for use.

My invention consists of a mixture of granulated blast-furnace slag, calcium hydroxide, sodium hydrate or its equivalents, magnesium silicofluoride and calcium fluoride. The proportions which I prefer to employ are 100 pounds granulated blast-furnace slag, 30 pounds of calcium hydroxide, 2 pounds of magnesium silicofluoride and 2 pounds of calcium fluoride. These proportions may of course be varied, according to the character of the slag and the quality of cement desired to produce. This composition having been made up is ground in a tube mill or similar apparatus adapted to afford the great fineness and intimacy of the mixture. The resultant product is then placed in bags and ready for use.

The advantages of my invention result from the use of the sodium hydrate, magnesium silicofluoride and calcium fluoride, since they greatly improve the strength, specific gravity, hardness and water-proofing qualities of the cement.

The proportions will naturally be varied according to the composition of the slag used, and the above is given as an example. The setting time of the cement could be varied from fast to slow by varying the proportions of the chemicals.

Having fully described my invention what I claim as new, and desire to secure by Letters Patent, is:

1. A slag cement including a 100 parts by weight of a finely ground mixture of granulated blast furnace slag, 30 parts by weight of calcium hydroxide, 3 pounds by weight of sodium hydrate, 2 parts by weight of magnesium silicofluoride and 2 parts by weight of calcium fluoride.

2. A slag cement made up of a finely ground mixture of granulated blast furnace slag, calcium hydroxide, sodium hydrate, magnesium silicofluoride and calcium fluoride.

In testimony whereof, I have hereunto signed my name to this specification.

GEORGE WITTY.